UNITED STATES PATENT OFFICE.

HENRY SPENCER BLACKMORE, OF MOUNT VERNON, NEW YORK.

PROCESS OF PRODUCING SULFURIC ACID AND METALLIC OXIDS.

SPECIFICATION forming part of Letters Patent No. 724,251, dated March 31, 1903.

Application filed February 14, 1900. Serial No. 5,203. (No specimens.)

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Producing Sulfuric Acid and Metallic Oxids; and I do hereby declare the following to be a full, clear, and exact description of the invention, such as will enable others skilled in the art to which it appertains to make and use the same.

The specific object of my invention is to produce sulfuric acid and aluminium oxid from aluminium sulfate in an economical manner, so that the larger portion of sulfuric radical will be recovered as acid without decomposition into free oxygen and sulfur dioxid, a difficulty experienced hitherto, the said difficulty precluding the recovery of sulfuric acid therefrom economically.

My invention, broadly stated, consists in making sulfuric acid and metallic oxid by displacing sulfur and oxygen from solid compositions containing said elements by the action of fluid containing hydrogen and oxygen heated to a temperature above that of the solid compositions employed and maintaining the temperature of the reacting ingredients below the dissociating or decomposing point of sulfuric acid—*i. e.*, below the temperature at which sulfur dioxid is liberated from sulfuric acid by the action of heat.

It is well known that aluminium sulfate when heated to redness loses its sulfuric radical by dissociation and aluminium oxid remains behind as a residue, contaminated, more or less, with acid; but it is found that the loss of acid radical by dissociation renders this method valueless from a commercial standpoint. The heat splits the sulfuric radical up into sulfur dioxid and free oxygen. My invention therefore relates particularly to a process for bringing about the transformation of aluminium sulfate at a temperature and under conditions which will preclude the dissociation of sulfur trioxid, but will absorb the same, regenerating sulfuric acid, which distils and is carried out of the apparatus in which the reaction is performed by the current of reagent.

The manner in which I proceed to carry out my process commercially consists in introducing the aluminium sulfate into a retort or container and preferably warm the same slightly—about 212° Fahrenheit—for the purpose of dehydrating the mass and making it porous and easily permeable by fluid reagents. Then introduce into the container highly-superheated steam, (HO.) The latent or occluded heat of the steam induces a reaction between the aluminium sulfate and the steam, resulting in the production of aluminium oxid and sulfuric acid, which latter is carried out of the apparatus by the excess or current of undecomposed steam and finally condensed. The reaction which takes place may be illustrated by the following chemical formula or equation:

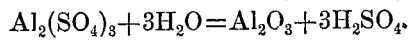

$$Al_2(SO_4)_3 + 3H_2O = Al_2O_3 + 3H_2SO_4.$$

It can be readily seen that, the reaction taking place in the body or presence of heated steam, dissociation of the sulfate is avoided and a definite reaction assured, thus entirely preventing dissociation into sulfur dioxid and free oxygen. The dry superheated steam thoroughly permeates the porous mass and also reacts throughout the mass, so that the aluminium oxid produced is not contaminated with acid to an injurious degree.

It is obvious that a current of dry superheated steam may be made to circulate through the apparatus in which the transformation is effected and the aluminium sulfate introduced from time to time as the transformation takes place and sulfuric acid distils, thereby making the operation practically continuous, the aluminium oxid produced being readily withdrawn from time to time without interrupting or retarding the process.

It will be observed that the reactions between solid compositions containing sulfur and oxygen, such as metallic sulfates, and fluids containing hydrogen and oxygen, such as dry steam, are maintained by the action of the latter fluid heated to a temperature higher than the solid composition from which the sulfur and oxygen are displaced or dissociated and whereby the loss of sulfur and oxygen by transformation into products other than sulfuric acid is avoided. It will also be noted that the temperature of the fluid containing hydrogen and oxygen is so regulated as to maintain the temperature of the reacting ingredients below the decomposing point of sulfuric acid and which temperature is controlled by heating the fluid prior to conveying the same in contact with the solid composition containing sulfur and oxygen, so that the temperature of the reacting ingredients can be regulated and maintained at will.

The character of the metallic sulfate employed in my process, as specifically described—viz., aluminium sulfate—is such that the sulfur and oxygen in proportion to form sulfuric acid with the elements of water are disengaged by merely heating, and hence the compound is infusible, being decomposed when heated before the fusing-point is reached.

Having now described my process, what I claim as new, and desire to secure by Letters Patent, is—

1. The process of making sulfuric acid which consists in displacing sulfur and oxygen from solid compositions containing said elements by the action of a fluid containing hydrogen and oxygen heated to a higher temperature than that of the solid compositions, and maintaining the ingredients at a reacting temperature and below the temperature at which sulfur dioxid is liberated from sulfuric acid by the action of heat.

2. The process of making sulfuric acid which consists in displacing sulfur and oxygen from solid compositions containing said elements by the action of a fluid containing hydrogen and oxygen supplied at a higher temperature than that of the solid compositions, and maintaining the ingredients at a reacting temperature and below the temperature at which sulfur dioxid is liberated from sulfuric acid by the action of heat.

3. The process of making sulfuric acid which consists in exposing a chemical compound containing sulfur and oxygen in proportion to form sulfuric acid when combined with the elements of water to the decomposing action of dry superheated steam, and maintaining the ingredients at a reacting temperature and below the temperature at which sulfur dioxid is liberated from sulfuric acid by the action of heat.

4. The process of making sulfuric acid which consists in heating and decomposing a chemical compound containing sulfur and oxygen in proportion to form sulfuric acid when combined with the elements of water by the transforming action of dry superheated steam, and maintaining the ingredients at a reacting temperature and below the temperature at which sulfur dioxid is liberated from sulfuric acid by the action of heat.

5. The process of making sulfuric acid which consists in initially heating a chemical compound containing sulfur and oxygen in proportion to form sulfuric acid when combined with the elements of water to a temperature of about 212° Fahrenheit and then subjecting the chemical compound thus initially heated to the action of dry superheated steam, the ingredients being maintained at a reacting temperature and below the temperature at which sulfur dioxid is liberated from sulfuric acid by the action of heat.

6. The process of making sulfuric acid which consists in initially heating a solid composition containing sulfur and oxygen capable of uniting with the elements of water to form sulfuric acid and maintaining the formation of sulfuric acid by supplying dry superheated steam to said composition, the ingredients being maintained at a reacting temperature and below the temperature at which sulfur dioxid is liberated from sulfuric acid by the action of heat.

7. The process of making sulfuric acid which consists in dissociating the sulfur and oxygen from solid compositions containing the same and concurrently uniting them with the elements of water by exposing the said composition in a heated condition to the action of dry superheated steam, and maintaining the ingredients at a reacting temperature and below the temperature at which sulfur dioxid is liberated from sulfuric acid by the action of heat.

8. The process of making sulfuric acid which consists in dissociating sulfur and oxygen from solid compositions containing the same and uniting them with the elements of water by exposing the said composition in a heated condition to the action of dry superheated steam, and maintaining the ingredients at a reacting temperature and below the temperature at which sulfur dioxid is liberated from sulfuric acid by the action of heat.

9. The process of making sulfuric acid which consists in subjecting a composition containing sulfur and oxygen to the transforming action of dry superheated steam, maintaining the ingredients at a reacting temperature and below the temperature at which sulfur dioxid is liberated from sulfuric acid by the action of heat and in delivering the acid from the place of formation with a current of steam, substantially as described.

10. The process of making sulfuric acid and metallic oxid which consists in exposing a metallic sulfate to the action of steam heated to a temperature above that of the metallic sulfate, and maintaining the ingredients at a reacting temperature and below the temperature at which sulfur dioxid is liberated from sulfuric acid by the action of heat.

11. The process of making sulfuric acid which consists in exposing a metallic sulfate to the action of a fluid containing hydrogen and oxygen maintained at a temperature above that of the metallic sulfate, the ingredients being at a reacting temperature and below the dissociating temperature of sulfuric acid.

12. The process of making sulfuric acid and metallic oxid which consists in continuously bringing together metallic sulfate and steam heated to a temperature higher than that of the metallic sulfate, the ingredients being maintained at a reacting temperature and below the temperature at which sulfur dioxid is liberated from sulfuric acid by the action of heat, collecting and condensing the vapors evolved and withdrawing the resulting oxid from time to time as desired.

13. The process of making sulfuric acid and aluminium oxid which consists in exposing aluminium sulfate to an atmosphere of steam heated to a temperature above that of the aluminium sulfate, and maintaining the ingredients at a reacting temperature and below the temperature at which sulfur dioxid is liberated from sulfuric acid by the action of heat.

14. The process of making sulfuric acid and aluminium oxid which consists in bringing together aluminium sulfate and steam heated to a higher temperature than the aluminium sulfate, maintaining the ingredients at a reacting temperature and below the temperature at which sulfur dioxid is liberated from sulfuric acid by the action of heat, and collecting and condensing the vapors evolved thereby.

15. The process of making sulfuric acid which consists in heating an infusible composition containing sulfur and oxygen while subjecting it to the action of a reacting or combining fluid containing hydrogen and oxygen, and maintaining the ingredients at a reacting temperature and below the dissociating point of sulfuric acid.

16. The process of making sulfuric acid and metallic oxid which consists in exposing an infusible metallic sulfate to the action of a fluid containing hydrogen and oxygen maintained at a temperature above that of the metallic sulfate, the ingredients being at a reacting temperature and below the dissociating point of sulfuric acid.

In testimony whereof I affix my signature in presence of two witnesses.

HENRY SPENCER BLACKMORE.

Witnesses:
   D. W. GARDNER,
   HARRY R. KING.